United States Patent
Chen

(10) Patent No.: US 12,018,200 B2
(45) Date of Patent: Jun. 25, 2024

(54) PERFLUORO SURFACTANT AND PREPARATION METHOD THEREFOR

(71) Applicant: Inner Mongolia Huansheng Technology Co., Ltd., Inner Mongolia Autonomous Region (CN)

(72) Inventor: Ai Chen, Inner Mongolia Autonomous Region (CN)

(73) Assignee: INNER MONGOLIA HUANSHENG TECHNOLOGY CO., LTD., Inner Mongolia Autonomous Region (CN)

( * ) Notice: Subject to any disclaimer, the term of this patent is extended or adjusted under 35 U.S.C. 154(b) by 559 days.

(21) Appl. No.: 17/293,699

(22) PCT Filed: Oct. 30, 2019

(86) PCT No.: PCT/CN2019/114220
§ 371 (c)(1),
(2) Date: May 13, 2021

(87) PCT Pub. No.: WO2020/098493
PCT Pub. Date: May 22, 2020

(65) Prior Publication Data
US 2022/0008881 A1    Jan. 13, 2022

(30) Foreign Application Priority Data
Nov. 15, 2018   (CN) .......................... 201811361290.7

(51) Int. Cl.
*C09K 23/00* (2022.01)
*C08G 65/00* (2006.01)
(52) U.S. Cl.
CPC .......... *C09K 23/007* (2022.01); *C08G 65/007* (2013.01)

(58) Field of Classification Search
CPC ...... C09K 23/007; C09K 3/18; C08G 65/336; C08G 65/007; C08G 77/46; C08G 77/24;
(Continued)

(56) References Cited

U.S. PATENT DOCUMENTS 4,003,941 A * 1/1977 Crawford ............. C08G 65/007
562/850

FOREIGN PATENT DOCUMENTS

| CN | 103936906 B | 8/2016 |
| CN | 105170018 B | 8/2016 |
| CN | 109384911 A | 2/2019 |

OTHER PUBLICATIONS

International Search Report issued in corresponding International Application No. PCT/CN2019/114220; mailed Feb. 1, 2020; State Intellectual Property Office of the P.R. China, Beijing, China, 8 pgs.
(Continued)

*Primary Examiner* — Shane Fang
(74) *Attorney, Agent, or Firm* — HAUPTMAN HAM, LLP

(57) ABSTRACT

A perfluoro surfactant and a preparation method therefor. A carbon fluorine bond is not prone to break when the perfluoro surfactant is used as an emulsifier in a fluorine polymer reaction, such that the average molecular weight of a fluorine polymer generated in the fluorine polymer reaction is significantly increased. The preparation method is implemented in a continuous micro-channel reaction system, where the retention time of a reactant in the reaction system can be greatly shortened to few minutes or even seconds, a back-mixing phenomenon in the reaction system can be basically eliminated, and thus the occurrence of a side reaction, an optical coupling reaction, can be greatly reduced. There are reaction stages comprising an ozonization reaction and a photo-oxidation reaction.

10 Claims, 2 Drawing Sheets

(58) Field of Classification Search
CPC ....... C08G 2650/48; C08L 71/00; C09D 4/00; C09D 171/00; C08K 5/5419
See application file for complete search history.

(56) References Cited

OTHER PUBLICATIONS

Written Opinion issued in corresponding International Application No. No. PCT/CN2019/114220; mailed Jan. 31, 2020; State Intellectual Property Office of the P.R. China, Beijing, China, 6 pgs.

* cited by examiner

PERFLUORO SURFACTANT AND PREPARATION METHOD THEREFOR

RELATED APPLICATIONS

The present application is a US National Phase of International Application Number PCT/CN2019/114220 filed Oct. 30, 2019 and claims priority to Chinese Application Number 201811361290.7 filed Nov. 15, 2018.

FIELD OF THE INVENTION

The present invention relates to the technical field of fluorinated surfactant, in particular to a perfluoro surfactant and a preparation method therefor.

BACKGROUND OF THE INVENTION

Fluorosurfactant, abbreviated as FSA, is a surfactant with fluorocarbon chain as a non-polar group, that is, fluorine atoms partially or completely replace hydrogen atoms on the hydrocarbon chain. Fluorocarbon surfactants have high surface activity, high thermodynamics and chemical stability.

At present, fluorosurfactants are widely used in the production process of fluoropolymer emulsion polymerization. However, the existing fluorosurfactants have perfluorooctanoic acid with an 8-carbon linear structure. Perfluorooctanoic acid is biologically toxic and can cause cancer, meanwhile perfluorooctanoic acid and its salts are not easily decomposed by nature and are easily enriched in the natural environment. Therefore, it is necessary to develop a fluorosurfactant without the 8-carbon linear structure of perfluorooctanoic acid.

In the prior art, Chinese Patent CN105170018B discloses a fluorosurfactant without perfluorooctanoic acid used as an emulsifier in the fluoropolymer emulsion polymerization process. Since the preparation process of the fluorosurfactant uses an alkene or alkyne containing at least one non-fluorine atom as the third monomer, the prepared fluorosurfactant has chemical bonds of non-fluorine atoms, such as hydrocarbons, bond or carbon halide bond other than fluorine. The chemical bond can be weakened under the influence of the strong electron-attracting fluoride ion, when the fluorosurfactant is used in the high temperature and high-pressure fluoropolymer emulsion polymerization system, the chemical bond is very unstable and easy to break and fall off to form free radicals are formed, resulting in a decrease in the average molecular weight of the produced fluoropolymer.

BRIEF SUMMARY OF THE INVENTION

The aim of the present invention is to provide a perfluoro surfactant and a preparation method therefor, so as to solve the problem that the chemical bonds of non-fluorine atoms in fluorosurfactants in the prior art are easily broken under high temperature and high-pressure, resulting in the low average molecular weight of fluoropolymer prepared by fluoropolymer emulsion technology.

The present invention realized through the following technical scheme:

A perfluoro surfactant has the structure shown in formula I:

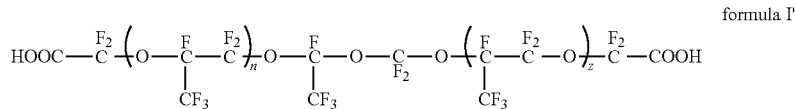

formula I' wherein n and z in formula I are integers, and n+z=1~100; the two repeating units in formula I are randomly distributed.

In the prior art, Chinese patent CN105170018B discloses a fluorosurfactant free of perfluorooctanoic acid, which is mainly used in the fluoropolymer emulsion polymerization process. The inventor found that in the technical route disclosed in the present invention, olefins or alkynes containing at least non-fluorine atoms are used as the third monomer, so that the prepared fluorine-containing surfactants have non-fluorine atom chemical bonds. When used in the high temperature and high-pressure fluoropolymer emulsion polymerization process, the dissociation energy of non-fluorine atom bonds in fluorosurfactants is much smaller than that of carbon-fluorine bonds, and the bonds are easily broken during the fluoropolymerization process, free radicals are formed, which in turn causes at least the following problems:

(1) the average molecular weight of fluoropolymer products is reduced;
(2) the increased consumption of fluoropolymer initiators requires constant addition of initiators during the production process;
(3) impurities generated by broken bonds reduce the stability of fluoropolymer emulsions, fluoropolymer emulsions are easy to demulsify, demulsification occurs during the production process, and even blasting may occur and cause production accidents.

To solve the above problems, the present invention provides a perfluoro surfactant represented by formula I. In formula I, the values of the polymerization degrees n and z of the two repeating units are integers, and the sum of n and z ranges from 1 to 100, and the value of n can be the same as or different from z. The two repeating units in formula I can be randomly distributed along the molecular chain.

The stability of perfluoro surfactants in the fluoropolymerization process under high temperature and high-pressure mainly depends on the nature of the halogen atoms in the carbon-halogen bond, and is also affected to a certain extent by the overall structure of the surfactant.

On the one hand, for halogenated alkanes, the bond energy of carbon-fluorine bonds is the highest among carbon-halogen bonds, and the bond energy of carbon-iodine bonds is the lowest, therefore, the thermal stability of carbon-fluorine bonds is usually high and is not easy to decompose. It can be seen that the molecular structure of formula I does not contain non-fluorocarbon-halogen bonds, therefore, when used as an emulsifier for fluoropolymer reaction, the carbon-fluorine bonds are not easily broken, so that the average molecular weight of fluoropolymers produced by the fluoropolymer reaction is significantly increased; at the same time, there is no need to constantly add initiators in the production process, saving the manufacturing cost of fluoropolymers; not only that, fluoropolymer emulsions are not easy to demulsify, thus improving the safety of fluoropolymer production.

On the other hand, the structure of formula I exhibits a high degree of symmetry, the electron clouds in the molecular structure are evenly distributed and arranged, which is conducive to attracting each other in the water body to form stable and spherical micro micelles, which are evenly distributed in the water body, providing a place for polymerization of fluoropolymers. The stability of the perfluoro surfactant represented by formula I can be further improved, so that the average molecular weight of the fluoropolymer produced by the fluoropolymer reaction is significantly increased.

The perfluoro surfactant shown in formula I has the following product indicators:
- average molecular weight: 300-20000;
- acid value: 1-300 mgNaOH/g;
- surface tension: 12~20 mN/m (in pure aqueous solution, the content is 1%, the temperature is 25° C.) (alkali metal salts, such as sodium salt, ammonium salt, potassium salt, etc.);
- critical micelle concentration: 1%-0.05%;
- purity: 80%-99.99%.

The present invention also provides a preparation method of the above-mentioned perfluoro surfactant, the preparation method comprises the following steps:
(A) ozonation: continuously pass hexafluoropropylene and ozone into the reaction system to obtain the active intermediate of formula II;

formula II

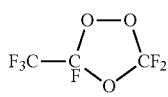

(B) photo-oxidation: pass hexafluoropropylene and oxygen into the reactive intermediate of formula II to obtain perfluoropolyether acyl fluoride of formula III;

formula III

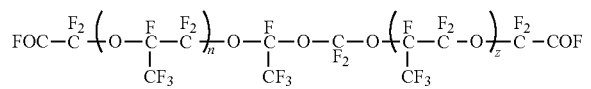

(C) hydrolysis: pour deionized water into the perfluoropolyether acyl fluoride of formula III, and obtain the perfluoro surfactant of formula I after hydrolysis.

The prior art mainly adopts a batch tank reactor for reaction. In the process of photo-oxidation reaction, the residence time of the reaction product in the reactor usually takes several hours. In the invention patent CN105170018B, the residence time of hexafluoropropylene and oxygen in the reaction kettle is 0.5-5 hours, and the reaction product has serious back mixing in the reaction system, causing a photocoupling reaction of the active acyl fluoride end groups under the irradiation of ultraviolet light, the active acyl fluoride end groups are combined in pairs, so that the acyl fluoride end groups of the reaction product disappear, and the probability of occurrence of this side reaction is very high, resulting in a decrease in the reaction yield.

In order to solve the above problems, the reaction system of the present invention is a continuous micro-channel reaction system. The continuous f reaction system comprises an ozonation reaction module and a photo-oxidation reaction module connected in sequence. Wherein the ozonation reaction module is used to perform the ozonation reaction in step (A), and the photo-oxidation reaction module is used to perform the photo-oxidation reaction in step (B). Both the ozonation reaction module and the photo-oxidation reaction module are composed of at least one micro-channel reactor.

Specifically, under the conditions of a temperature of −10 to 150° C. and a pressure of 0.1 to 2 MPa, first, a plunger pump is used to pump hexafluoropropylene and ozone into the micro-channel reactor of the ozonation reaction module. Preferably, the temperature is 10-50° C., and the pressure is 0.6-0.8 MPa. Preferably, the flow ratio of hexafluoropropylene and ozone is 3-6:1, and the flow rate of hexafluoropropylene is 30-35 ml/min. The hexafluoropropylene and ozone undergo the ozonation reaction in step (A) in the ozonation reaction module to obtain an active intermediate

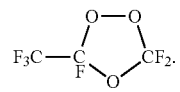

In step (A), the reaction of hexafluoropropylene and ozone does not need to add an initiator.

The reaction formula of step (A) is:

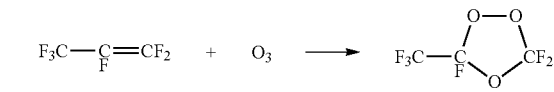

The active intermediate

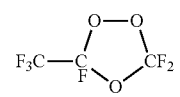

generated in step (A) and the unreacted hexafluoropropylene enter the micro-channel reactor of the photo-oxidation reaction module, and at the same time, a certain flow rate of oxygen is introduced into the micro-channel reactor. The O—O bond of the active intermediate

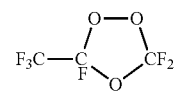

is broken under the ultraviolet light of the photo-oxidation reaction module the to form

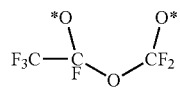

with free radicals at both ends, the reaction formula is:

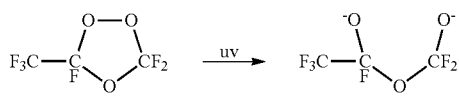

In the photo-oxidation reaction module, the free radical active monomer has chain growth with the double bond of the hexafluoropropylene and oxygen to obtain the perfluoropolyether with acyl fluoride end group at both ends are in formula III.

After that, the perfluoropolyether acyl fluoride of formula III is pumped into the hydrolysis micro-channel reaction system, and deionized water is pumped into the hydrolysis micro-channel reaction system at the same time. The perfluoropolyether acyl fluoride of formula III is hydrolyzed to produce the perfluoro surfactant of formula I.

Compared with the prior art, the preparation method disclosed in the present invention uses a continuous flow micro-channel reactor to greatly shorten the residence time of the reactants in the reaction system to several minutes or even seconds, and basically eliminates the back-mixing phenomenon in the reaction system, thereby significantly reduces the occurrence of side reactions and light coupling reactions, perfluoropolyethers with acyl fluoride end groups greater than 90% can be obtained without using non-fluorinated halogen-containing olefins as the third monomer, and there is no need to introduce non-fluorocarbon halogen bonds, the stability of the perfluoro surfactant in the fluoropolymerization reaction is improved from the source.

Not only that, the prior art mainly uses hexafluoropropylene and oxygen as raw materials, and uses ultraviolet light to illuminate the entire reaction system to perform the photo-oxidation reaction. However, oxygen is randomly converted to ozone under ultraviolet light irradiation, so that in the reaction system, as the reaction time increases, the amount of ozone and the existence time in the reaction system are uncontrollable. In engineering applications, it is actually impossible to control the ratio of main and side reactions, resulting in a low yield of the main product and many by-products. The preparation method disclosed in the present invention uses ozone as a raw material to perform ozonation reaction in the ozonation reaction module, and then fills oxygen in the photo-oxidation reaction module to perform the photo-oxidation reaction under ultraviolet light illumination. Through the above settings, even if the supplemented oxygen is partially converted into ozone randomly under light conditions, due to the short reaction time and the small proportion of oxygen, the amount of ozone generated can be basically ignored compared with the amount of ozone in the raw material, so user can adjust the reaction time in the ozonation reaction module and the photo-oxidation reaction module, as well as the amount of ozone and oxygen added, to achieve the purpose of controlling the amount and existence time of ozone in the entire reaction system, and then control the ratio of main and side reactions, significantly improve the yield of perfluoropolyether acyl fluoride and perfluoro surfactant.

In addition, the continuous micro-channel reaction system of the present invention can also well control the degree of polymerization of the perfluoro surfactant and the perfluoropolyether acyl fluoride needed to prepare, that is, the molecular weight of the perfluoro surfactant and perfluoropolyether acyl fluoride. Without increasing the raw materials, by increasing the residence time of the reaction system in the ozonation reaction module and/or photo-oxidation reaction module, both perfluoro surfactants and perfluoropolyethers with a molecular weight of 500-800 can be obtained, the perfluoropolyether acyl fluoride with a molecular weight of 1,000 to 20,000 can also be obtained, as a bifunctional modified third monomer, can participate in the modification of polyacrylic acid, polyurethane, polyester and other hydrocarbon polymers to make it fully part of the characteristics of fluoropolymers, reduce the surface tension of hydrocarbon polymers, improve the weather resistance, chemical resistance, and hydrolysis resistance of hydrocarbon polymers.

Further, the ozonation reaction module comprises at least one first micro-channel reactor, and the photo-oxidation reaction module comprises at least one second micro-channel reactor. Wherein the first micro-channel reactor is not provided with an ultraviolet light illumination system, and the second micro-channel reactor is provided with an ultraviolet light illumination system. Through the above settings, adding or reducing the first micro-channel reactor can prolong or shorten the reaction time of the reaction system in the ozonation reaction module; adding or reducing the second micro-channel reactor can prolong or shorten the reaction time of the reaction system in photo-oxidation reaction module. It is helpful for the user to adjust the reaction time of the reaction system in each reaction stage, and control the molecular weight of the perfluoropolyether acyl fluoride product and the perfluoro surfactant.

Further, the number of the first micro-channel reactor is 1-30, and the number of the second micro-channel reactor is 3-50.

As a preferred structure of the second micro-channel reactor, the second micro-channel reactor comprises a flow channel, the two sides of the flow channel are provided with mounting plates, the mounting plate is provided with an LED ultraviolet lamp group, the LED ultraviolet lamp group comprises a plurality of LED ultraviolet lamps arranged at equal intervals, and the wavelength range of the LED ultraviolet lamps is 190-610 nm. In the photo-oxidation reaction stage, ultraviolet light will initiate free radical reactions, and the intensity of ultraviolet light has an important influence on the reaction. The present invention improves the existing micro-channel reactor. Specifically, mounting plates are arranged on the left and right sides of the flow channel of the second micro-channel reactor, and an LED ultraviolet lamp group is arranged on the mounting plate, and the LED ultraviolet lamp group comprises a plurality of LED ultraviolet lamps arranged at equal intervals. Through the above improvement, the ultraviolet light intensity received by the reaction system everywhere in the flow channel is basically the same, that is, the luminous flux is the same. By changing the light intensity, the user can not only reduce the occurrence of side reactions, but also adjust the degree of polymerization of the two repeating units in the perfluoro surfactant, which is more conducive to the user to control the molecular weight of the perfluoropolyether acyl fluoride product and the perfluoro surfactant. Preferably, the LED ultraviolet lamp groups on the left and right sides are symmetrical about the vertical central axis of the flow channel.

Further, the number of gas-liquid mixing chambers of the first micro-channel reactor and the second micro-channel reactor is not less than 50. Both the first micro-channel reactor and the second micro-channel reactor are provided with multiple gas-liquid mixing chambers connected in sequence to ensure that the gas and liquid reaction materials are fully mixed during the flow of the gas and liquid reaction materials in the micro-channel reactor, to prevent the phenomenon of gas-liquid separation forming a fluid state in which gas and liquid are separated, resulting in insufficient reaction and no reaction in the flow channel. In practice, the number of gas-liquid mixing chambers of each first micro-channel reactor or second micro-channel reactor is not less than 50.

Further, the micro-channel reaction system further comprises a gas-liquid separation tank, and the inlet end of the gas-liquid separation tank is connected with the outlet end of the photo-oxidation reaction module. After the photo-oxidation reaction is over, the reaction system enters the gas-liquid separation tank for gas-liquid separation to obtain the perfluoropolyether acyl fluoride product.

Further, the reaction temperature of step (A) and step (B) is −10~150° C., the inlet pressure of the reaction system of step (A) and step (B) is 0.1~2 MPa, and the outlet pressure is 0.2~2 MPa.

Compared with the prior art, the present invention has the following advantages and beneficial effects:

1. The perfluoro surfactant provided by the present invention does not contain non-fluorocarbon-halogen bonds, so when it is used as an emulsifier for fluoropolymer reaction, the carbon-fluorine bond is not easy to break, increasing the average molecular weight of fluoropolymer; at the same time, there is no need to continuously add initiator during the production process, saving the manufacturing cost of fluoropolymer; not only that, fluoropolymer emulsion is not easy to demulsify, thus improving the safety of fluoropolymer production;

2. The perfluoro surfactant provided by the present invention exhibits a highly symmetrical molecular structure in which the electron cloud is uniformly distributed and arranged, which is conducive to attracting each other in the water body to form stable and spherical micro micelles, which are evenly distributed in the water body, providing the place where the fluoropolymer polymerizes.

3. The reaction system of the present invention adopts a continuous micro-channel reaction system, which can greatly shorten the residence time of the reactants in the reaction system to several minutes or even seconds, basically eliminate the back-mixing phenomenon in the reaction system, thereby greatly reducing side reactions and light coupling reactions It is possible to obtain a perfluoropolyether with an acyl fluoride end group content greater than 90% without using non-fluorine-containing halogen olefins as the third monomer, and there is no need to introduce non-fluorine-carbon-halogen bonds, the stability of fluorosurfactant in fluoropolymerization reaction;

4. The disclosed preparation method of the present invention uses ozone as a raw material for the ozonation reaction in the ozonation reaction module, and then oxygen is added to the photo-oxidation reaction module and the photo-oxidation reaction is carried out under ultraviolet light illumination conditions, allowing use By adjusting the reaction time in the ozonation reaction module and the photo-oxidation reaction module, as well as the addition amount of ozone and oxygen, the goal of controlling the amount and existence time of ozone in the entire reaction system, and then controlling the ratio of main and side reactions, Significantly increase the yield of perfluoropolyethers and perfluoro surfactants with diacyl fluoride end groups;

5. The present invention can control the molecular weight of perfluoro surfactant and perfluoropolyether acyl fluoride by increasing the residence time of the reaction system in the ozonation reaction module and/or the photo-oxidation reaction module without increasing the raw materials;

6. The present invention improves the second micro-channel reactor used in the photo-oxidation reaction module, so that the ultraviolet light intensity received by the reaction system is basically the same everywhere in the flow channel, and the user can not only reduce the intensity by changing the light intensity The occurrence of side reactions can also adjust the degree of polymerization of the two repeating units in the perfluoro surfactant, which is more conducive for users to control the molecular weight of the perfluoro surfactant.

BRIEF DESCRIPTION OF THE DRAWINGS

The drawings described herein are used to provide a further understanding for the embodiment of the present invention and form part of this application and do not constitute a qualification for the embodiment of the present invention. In the following drawings.

DETAILED DESCRIPTION OF THE PREFERRED EMBODIMENTS

In order to make the objectives, technical solutions, and advantages of the present invention more clarity and understanding a further detailed description of the present invention is provided in conjunction with embodiments and drawings. The exemplary embodiments and descriptions of the present invention are only used to explain the present invention, but not served as a qualification for the present invention.

All the raw materials of the present invention have no special restrictions on their sources, and they can be prepared on the market or according to conventional methods well known to those skilled in the art.

Brand names and abbreviations of all the raw materials of the present invention, belong to the conventional brand names and abbreviations in the field. Each brand and abbreviation are clearly defined in the field of its related use. The skilled in the art can purchase from the market or prepared by conventional methods according to the brand names, abbreviations and corresponding uses.

The purity of all raw materials of the present invention is not particularly limited, and the present invention preferably adopts the purity requirements of analytical purity or conventional purity in the field of adhesive preparation.

The present invention does not particularly limit the expression of the substituents, and all adopts expression method well known to the skilled in the art. Based on common knowledge, the skilled in the art can correctly understand the meaning according to the expression method.

Embodiment 1

Preparation of Perfluoropolyether Acyl Fluoride P1

Figure 2:
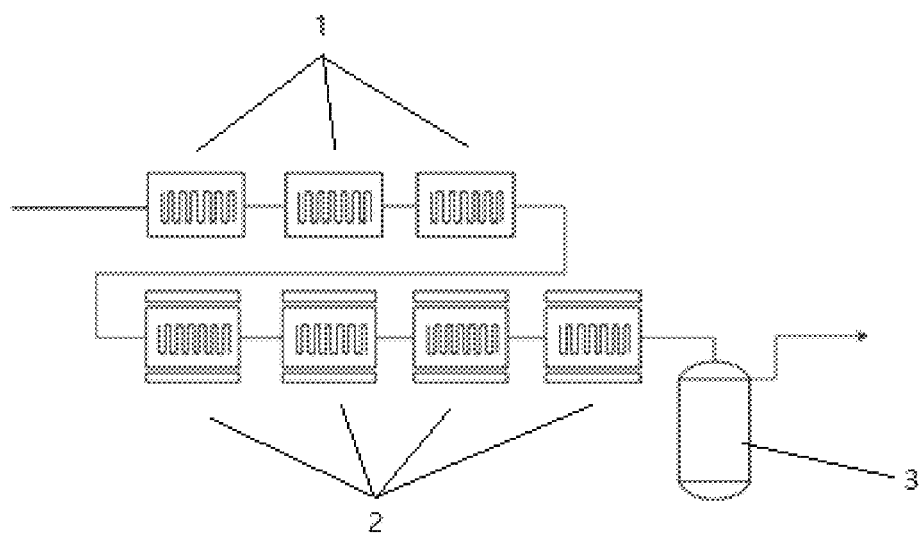
FIG. 2 is a schematic diagram of the continuous micro-channel reaction system in a specific embodiment of the present invention.
Figure 3:
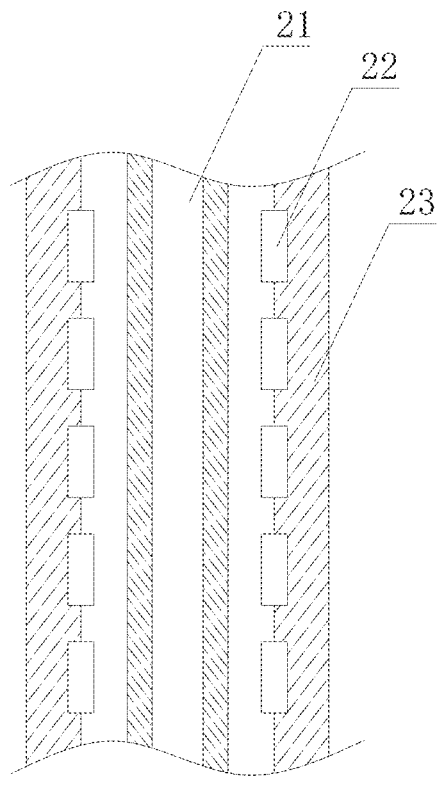
FIG. 3 is a schematic structural diagram of the second micro-channel reactor in a specific embodiment of the present invention.

As shown in FIG. 2, the continuous flow micro-channel reaction system comprises three first micro-channel reactors 1 and four second micro-channel reactors 2, wherein the third first micro-channel reactor 1 and the first second micro-channel reactor 2 is connected, and the fourth second micro-channel reactor 2 is connected with the gas-liquid separation tank 3.

During the reaction, hexafluoropropylene is pumped into the reaction system through a plunger pump at a flow rate of 30 ml/min, ozone is pumped into the reaction system at a flow rate of 10 ml/min, and ozonation reaction of the hexafluoropropylene and ozone are carried out in three first micro-channel reactors 1 to obtain

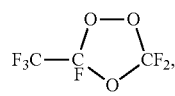

the reaction temperature of the first micro-channel reactor 1 is controlled at 10° C. Then, oxygen is pumped into the first second micro-channel reactor 2 at a flow rate of 10 ml/min, and the hexafluoropropylene, oxygen and reactive intermediates

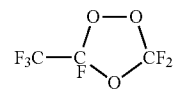

are reacted under the illumination of LED ultraviolet light to obtain perfluoropolyether acyl fluoride P1, the UV wavelength is 365 nm, and the reaction temperature of the second micro-channel reactor 2 is controlled at 10° C. The perfluoropolyether acyl fluoride P1 and the raw materials are separated in the gas-liquid separation tank 3. The total residence time of hexafluoropropylene in the reaction system is 1.148 min, and the outlet pressure at the end of the reaction system is 1 MPa.

The output of perfluoropolyether acyl fluoride P1 is 20 ml/min, and the average molecular weight is 748. The recovery rate of hexafluoropropylene is 2 ml/min, and the conversion rate of hexafluoropropylene is 93%.

Preparation of Perfluoro Surfactant S1

600 ml perfluoropolyether acyl fluoride P1 is pumped into the hydrolysis micro-channel reaction system at a flow rate of 30 ml/min, and deionized water is pumped into the reaction system at a flow rate of 10 ml/min. The hydrolysis micro-channel reaction system comprises five first micro-channel reactors 1 connected in sequence. After the perfluoropolyether acyl fluoride P1 and deionized water are reacted in the hydrolysis micro-channel reaction system, 560 ml of perfluoro surfactants with different polymerization degrees are obtained through oil-water separation. Afterwards, the perfluoro surfactant is rectified to obtain perfluoro surfactant S1. The output of perfluoro surfactant S1 is 512 ml, and the yield is 85%.

The structural formula of nerfluoro surfactant S1 is:

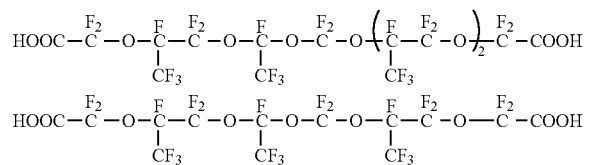

Figure 1:
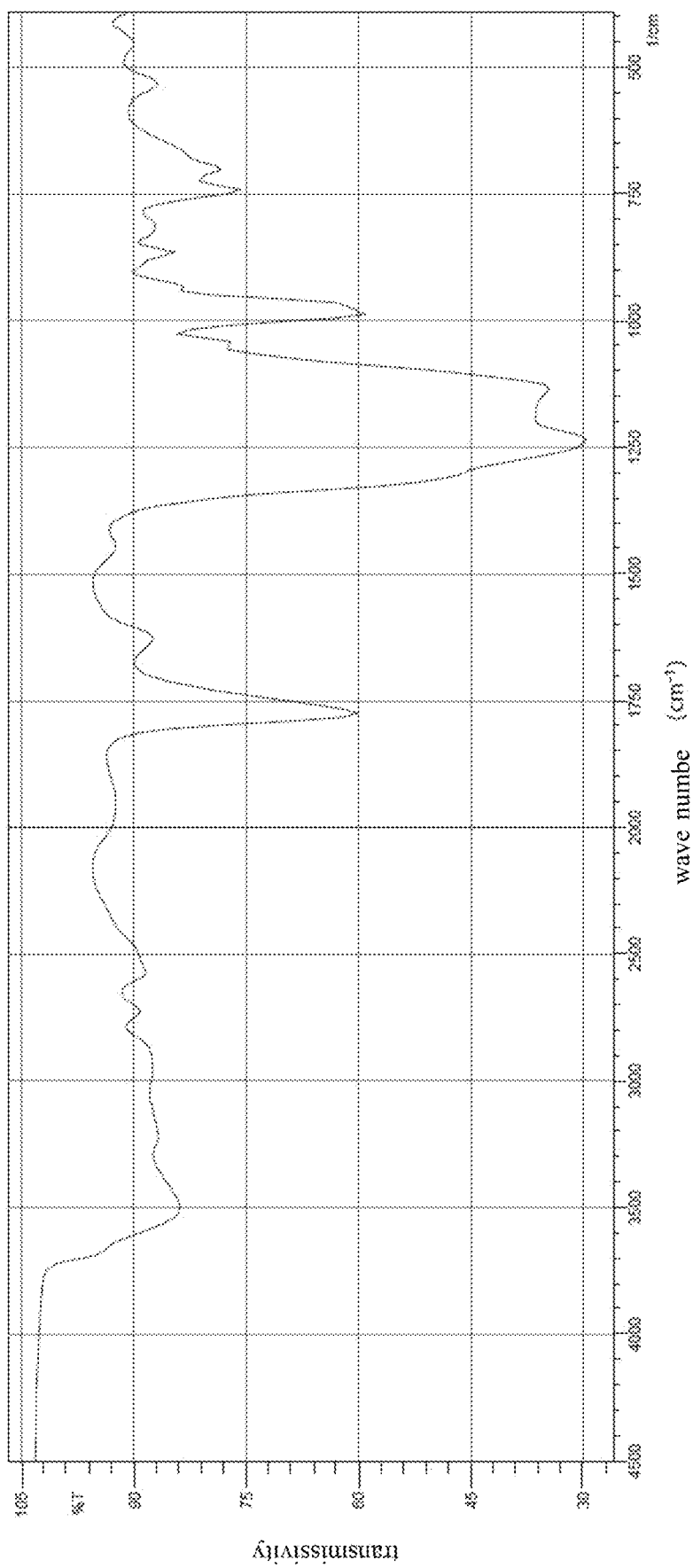
FIG. 1 is an infrared spectrum diagram of the perfluoro surfactant in a specific embodiment of the present invention.

S1 is a mixture of the above two compounds, with an average molecular weight of 754;

FIG. 1 shows the infrared spectrum of perfluoro surfactant S1. It can be seen from the figure that the characteristic absorption peak at 1000-1300 cm-1 in the product indicates the ether bond stretching vibration of C—O—C, characteristic absorption peak at 3500-3550 indicates stretching vibration of O—H, characteristic absorption peak at 1700-1800 indicates the stretching vibration of C=O, which indicates the polymer as the structure shown in formula I.

Embodiment 2

Preparation of Perfluoropolyether Acyl Fluoride P2

The continuous flow micro-channel reaction system comprises two first micro-channel reactors 1 and eight second micro-channel reactors 2, where the second first micro-channel reactor 1 and the first second micro-channel reactor 2 Connected, the eighth second micro-channel reactor 2 is connected to the gas-liquid separation tank 3.

During the reaction, hexafluoropropylene is pumped into the reaction system through a plunger pump at a flow rate of 30 ml/min, ozone is pumped into the reaction system at a flow rate of 5 ml/min, and ozonation reaction of the hexafluoropropylene and ozone are carried out in three first micro-channel reactors 1 to obtain

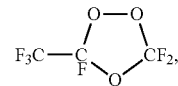

and the reaction temperature of the first micro-channel reactor 1 is controlled at 10° C. After that, oxygen is pumped into the first second micro-channel reactor 2 at a flow rate of 10 ml/min, hexafluoropropylene, oxygen and reactive intermediates

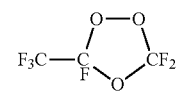

react under the illumination of LED ultraviolet light to obtain perfluoropolyether acyl fluoride P2, the UV wavelength is 365 nm, and the reaction temperature of the second micro-channel reactor 2 is controlled at 10° C. The perfluoropolyether acyl fluoride P2 and the raw materials are separated in the gas-liquid separation tank 3. The total residence time of hexafluoropropylene in the reaction system is 1.64 min, and the outlet pressure at the end of the reaction system is 1 MPa.

The output of perfluoropolyether acyl fluoride P2 is 23 ml/min, and the average molecular weight of perfluoropolyether acyl fluoride P2 is 17,000. The recovery rate of hexafluoropropylene is 5 ml/min, and the conversion rate of hexafluoropropylene is 83%.

Preparation of Perfluoro Surfactant S2

The perfluoropolyether acyl fluoride P2 is hydrolyzed according to the method in embodiment 1 to prepare the dicarboxylic acid-terminated perfluoropolyether S2. The yield of perfluoropolyether S2 with dicarboxylic acid end groups is 620 ml, and the yield is 82.2%.

The structural formula of perfluoro surfactant S2 is:

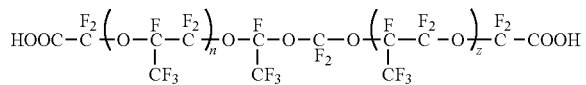

n=45~50, z=45~50, n and z can be the same or different.

Because only the polymer of the repeating unit is changed, the infrared spectrum of perfluoro surfactant S2 is the same as that of perfluoro surfactant S1.

It is worth noting that in addition to perfluoropolyether acyl fluoride P2 can be hydrolyzed to obtain perfluoro surfactant S2, it can also be used as a bifunctional modified third monomer to participate in the development of polyacrylic acid, polyurethane, polyester and other hydrocarbon polymers. Modification to make it have some of the characteristics of perfluoro polymer, reduce the surface tension of hydrocarbon polymer, improve the weather resistance of hydrocarbon polymer, chemical media resistance, hydrolysis resistance, etc.

Embodiment 3

Perfluoro Surfactant Stability Verification Test:

The perfluoro surfactant S1 prepared in embodiment 1 is verified by the polymerization scheme disclosed in patent CN103936906B.

It comprises the following steps:
(S01) Preparation of aqueous solution of ammonium salt of perfluoro surfactant S1:

Adding 700 g of deionized water and 100 g of 25% ammonia in a 2000 ml glass beaker, then slowly and uniformly dropping 200 g of perfluoro surfactant S1 into the deionized water through a glass dropping funnel, and stirring while adding it, with stirring speed 80 rpm, to obtain the ammonium salt aqueous solution of perfluoro surfactant S1 for later use, wherein the weight ratio of the ammonium salt of the dicarboxylic acid-terminated perfluoropolyether to water is 20:100;
(S02) Preparation for polymerization: replacing the high-pressure polymerization vessel with nitrogen to exhaust oxygen, and evacuating the high-pressure polymerization vessel until the oxygen content in the vessel is 25 ppm;
(S03) Polymerization process:
(S1) Feeding: adding 55 kg of deionized water, 972 g of paraffin wax and 1000 g of 20% perfluoro surfactant S1 ammonium salt aqueous solution to a 100 L stainless steel autoclave with baffles;
(S2) Preparation of initiator: dissolving 6.0 g of ammonium persulfate in 1 L of warm water (about 75° C.) to obtain 0.6% ammonium persulfate aqueous solution;
(S3) Initiation of the reaction: pressurizing the high-pressure polymerization vessel with tetrafluoroethylene, and heating to 73° C. while stirring, with stirring speed 200 rpm, again using tetrafluoroethylene to increase the pressure of the high-pressure polymerization vessel until the pressure in the polymerization vessel reaches 1.8 Mpa, the temperature reaches 73° C., using a metering pump to add the initiator prepared in step S2 to the polymerization kettle;
(S4) When the pressure of the autoclave drops to 1.7 MPa, adding tetrafluoroethylene again, maintaining the pressure at 1.8 MPa and the temperature at 73° C. for polymerization;
(S5) When the added amount of tetrafluoroethylene reaches 27 kg, stopping the polymerization reaction, the reaction time is 200 min.

After the reaction is over, the lid of the reactor is opened, and the inner surface of the reactor can be observed to find that the inner surface of the reactor is clean and free of condensation. The polytetrafluoroethylene emulsion prepared by this method is filtered with a 300-mesh metal filter, and the surface of the filter without solid particles or powder impurities can be observed. It can judge that no solid particles of polytetrafluoroethylene is precipitated during the reaction and the emulsion is stable. The obtained solid polytetrafluoroethylene is subjected to differential scanning calorimetry analysis, and the initial decomposition temperature of the polytetrafluoroethylene is 345.67° C.

Comparative Embodiment 1

The same polymerization scheme in Embodiment 3 was used to verify the 1-bromo-polyfluoroalkyl ammonium carboxy ether fluorine-containing emulsifier containing non-fluorocarbon halogen bonds disclosed in CN103936906B.

After the reaction is over completed, the lid of the reactor was opened, a large amount of white solid or powder condensed on the inner surface of the reactor can be observed in the inner surface of the reactor. The PTFE emulsion prepared by this method is filtered with a 300-mesh metal filter. The surface of the filter solid particles or powder impurities can be observed. Therefore, it can judge that a large amount of PTFE particles is precipitated during the reaction and the emulsion is unstable. The obtained solid polytetrafluoroethylene is as subjected to differential scanning calorimetry analysis, and the initial decomposition temperature of the polytetrafluoroethylene is 330.48° C.

By comparison, it can be seen that the perfluoro surfactant S1 prepared in this application has good stability in the polytetrafluoroethylene polymerization experiment, so that no solid polytetrafluoroethylene particles are precipitated during the polymerization reaction, and the emulsion is stable. At the same time, the initial decomposition temperature of the prepared polytetrafluoroethylene is 345.67° C., which was significantly higher than the 330.48° C. in the comparative embodiment, indicating that the degree of polymerization of polytetrafluoroethylene is higher.

Embodiment 4

On the basis of embodiment 1 and embodiment 2, the structures of the first micro-channel reactor 1 and the second micro-channel reactor 2 are improved.

Wherein the second micro-channel reactor 2 comprises a flow channel 21, the two sides of the flow channel 21 are provided with mounting plates 23, the mounting plate 23 is provided with an LED ultraviolet lamp group, the LED ultraviolet lamp group comprises a plurality of LED ultraviolet lamps 22 are arranged at equal intervals, and the wavelength range of the LED ultraviolet lamps is 190-610 nm.

The number of gas-liquid mixing chambers of the first micro-channel reactor 1 or the second micro-channel reactor 2 is not less than 50.

Through the improvement of the second micro-channel reactor 2, the UV light intensity of the reaction system is basically the same everywhere in the flow channel. By changing the light intensity, the user can not only reduce the occurrence of side reactions, but also adjust the perfluoropolyether, the degree of polymerization of the two repeating units is more conducive for users to control the molecular weight of the perfluoropolyether acyl fluoride product.

In addition, the gas-liquid mixing chamber can ensure that the gas and liquid reaction materials are fully mixed during the flow of the micro-channel reactor, prevent the phenomenon of gas-liquid separation in the flow channel, and form a fluid state with gas and liquid spaced apart, avoid inadequate or non-reaction.

The specific embodiments described above further describe the purpose, technical solutions and beneficial effects of the present invention in further detail. It should be understood that the above descriptions are only specific embodiments of the present invention and are not intended to limit the scope of the present invention. The scope of protection, any modification, equivalent replacement, improvement, etc., made within the spirit and principle of the present invention shall be comprised in the scope of protection of the present invention.

The invention claimed is:

1. A perfluoro surfactant, wherein the surfactant has the structure shown in formula I:

formula I

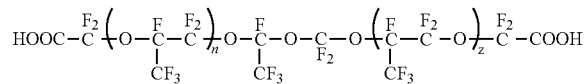

wherein n and z in formula I are integers, and n+z=1~100.

2. A perfluoro surfactant according to claim 1, wherein the average molecular weight of the perfluoro surfactant is 300 to 20,000.

3. A method for preparing perfluoro surfactant according to claim 1, wherein the method comprises the following steps:
(A) ozonation: continuously passing hexafluoropropylene and ozone into the reaction system to obtain the active intermediate of formula II;

formula II

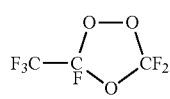

(B) photo-oxidation: passing hexafluoropropylene and oxygen into the active intermediate of formula II to obtain perfluoropolyether acyl fluoride of formula III;

formula III

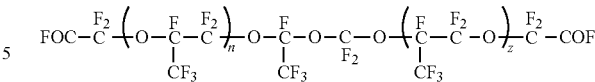

(C) hydrolysis: passing deionized water into the perfluoropolyether acyl fluoride of formula III, and obtaining the perfluoro surfactant of formula I after hydrolysis.

4. A method for preparing perfluoro surfactant according to claim 3, wherein the preparation method is implemented in a continuous micro-channel reaction system, the continuous micro-channel reaction system comprises an ozonation reaction module and a photo-oxidation reaction module connected in sequence; the ozonation reaction module is used for ozonation reaction in step (A), the photo-oxidation reaction module is used for the photo-oxidation reaction in step (B).

5. A method for preparing perfluoro surfactant according to claim 4, wherein the ozonation reaction module comprises at least one first micro-channel reactor, and the photo-oxidation reaction module comprises at least one second micro-channel reactor.

6. A method for preparing perfluoro surfactant according to claim 5, wherein the number of the first micro-channel reactor is 1-30, and the number of the second micro-channel reactor is 3-50.

7. A method for preparing perfluoro surfactant according to claim 5, wherein the second micro-channel reactor comprises a flow channel, the two sides of the flow channel are provided with mounting plates, and the mounting plate is provided with an LED ultraviolet lamp group, the LED ultraviolet lamp group comprises a plurality of LED ultraviolet lamps arranged at equal intervals, and the wavelength range of the LED ultraviolet lamps is 190-610 nm.

8. A method for preparing perfluoro surfactant according to claim 5, wherein the number of gas-liquid mixing chambers of the first micro-channel reactor and the second micro-channel reactor is not less than 50.

9. A method for preparing perfluoro surfactant according to claim 5, wherein the micro-channel reaction system further comprises a gas-liquid separation tank, and the inlet end of the gas-liquid separation tank is connected with the outlet end of the photo-oxidation reaction module.

10. A method for preparing perfluoro surfactant according to claim 3, wherein the reaction temperature of the step (A) and step (B) is −10~150° C., the inlet pressure of the reaction system of step (A) and step (B) is 0.1~2 MPa, and the outlet pressure is 0.2~2 MPa.

* * * * *